(12) United States Patent
In et al.

(10) Patent No.: US 11,721,460 B2
(45) Date of Patent: Aug. 8, 2023

(54) METHOD FOR PREPARING METAL POWDER, AND METAL POWDER

(71) Applicant: LG Chem, Ltd., Seoul (KR)

(72) Inventors: June Ho In, Daejeon (KR); Soon Jae Kwon, Daejeon (KR); Ik Jin Choi, Daejeon (KR); Hyoun Soo Uh, Daejeon (KR); Jung Won Park, Daejeon (KR); Byung Kyu Lim, Daejeon (KR); Pum Suk Park, Daejeon (KR)

(73) Assignee: LG Chem, Ltd.

( * ) Notice: Subject to any disclaimer, the term of this patent is extended or adjusted under 35 U.S.C. 154(b) by 741 days.

(21) Appl. No.: 16/318,478

(22) PCT Filed: Oct. 18, 2017

(86) PCT No.: PCT/KR2017/011536
§ 371 (c)(1),
(2) Date: Jan. 17, 2019

(87) PCT Pub. No.: WO2018/088709
PCT Pub. Date: May 17, 2018

(65) Prior Publication Data
US 2019/0292635 A1 Sep. 26, 2019

(30) Foreign Application Priority Data
Nov. 8, 2016 (KR) .................. 10-2016-0148269

(51) Int. Cl.
*H01F 1/057* (2006.01)
*B22F 9/04* (2006.01)
(Continued)

(52) U.S. Cl.
CPC .............. *H01F 1/0572* (2013.01); *B22F 1/06* (2022.01); *B22F 1/16* (2022.01); *B22F 9/04* (2013.01);
(Continued)

(58) Field of Classification Search
CPC ........................................................ H01F 1/057
See application file for complete search history.

(56) References Cited

U.S. PATENT DOCUMENTS 4,837,109 A    6/1989   Tokunaga et al.
5,057,148 A * 10/1991   Micheli ................ C22C 1/0441
                                                                                    75/351

(Continued)

FOREIGN PATENT DOCUMENTS

CN        1261717 A    8/2000
CN     101136275 A    3/2008
(Continued)

OTHER PUBLICATIONS

Espacenet machine translation of JP 62188772 A retrieved on Sep. 27, 2021 (Year: 1987).*

(Continued)

*Primary Examiner* — Jophy S. Koshy
*Assistant Examiner* — Joshua S Carpenter
(74) *Attorney, Agent, or Firm* — Lerner David LLP

(57) ABSTRACT

A method for preparing a metal powder includes preparing a mixture by mixing a fluoride of a group 1 element, a fluoride of a group 2 element or a transition metal fluoride, with neodymium oxide, boron, iron, and a reducing agent; and heating the mixture at a temperature of 800° C. to 1100° C.

12 Claims, 10 Drawing Sheets

(51) Int. Cl.

| | |
|---|---|
| *C22C 33/02* | (2006.01) |
| *C22C 38/00* | (2006.01) |
| *B22F 9/24* | (2006.01) |
| *B22F 9/20* | (2006.01) |
| *B22F 1/16* | (2022.01) |
| *B22F 1/06* | (2022.01) |
| *B22F 1/05* | (2022.01) |

(52) U.S. Cl.
CPC ............... *B22F 9/20* (2013.01); *B22F 9/24* (2013.01); *C22C 33/02* (2013.01); *C22C 33/0235* (2013.01); *C22C 38/005* (2013.01); *H01F 1/057* (2013.01); *B22F 1/05* (2022.01); *B22F 2301/355* (2013.01); *C22C 2202/02* (2013.01); *Y02B 10/30* (2013.01)

(56) References Cited

U.S. PATENT DOCUMENTS

| | | | |
|---|---|---|---|
| 6,309,441 | B1 | 10/2001 | Benz et al. |
| 7,569,114 | B2 * | 8/2009 | Komuro ............ H01F 1/0572 148/302 |
| 2002/0144754 | A1 | 10/2002 | Tokoro et al. |
| 2004/0189426 | A1 | 9/2004 | Hidaka et al. |
| 2005/0284545 | A1 | 12/2005 | Komuro et al. |
| 2006/0022175 | A1 | 2/2006 | Komuro et al. |
| 2007/0065677 | A1 | 3/2007 | Satsu et al. |
| 2008/0054738 | A1 | 3/2008 | Komuro et al. |
| 2012/0114515 | A1 | 5/2012 | Kaneko et al. |
| 2013/0271248 | A1 | 10/2013 | Nagata et al. |
| 2015/0187494 | A1 | 7/2015 | Lee et al. |
| 2015/0348685 | A1 | 12/2015 | Hu et al. |
| 2016/0027564 | A1 | 1/2016 | Une et al. |
| 2016/0260530 | A1 | 9/2016 | Yue et al. |

FOREIGN PATENT DOCUMENTS

| | | | |
|---|---|---|---|
| CN | 102667978 | A | 9/2012 |
| CN | 103377791 | A | 10/2013 |
| CN | 106710768 | A | 5/2017 |
| EP | 0945878 | A1 | 9/1999 |
| JP | 62188772 | A * | 8/1987 |
| JP | S62188772 | A | 8/1987 |
| JP | H04221805 | A | 8/1992 |
| JP | H09186010 | A | 7/1997 |
| JP | H11054353 | A | 2/1999 |
| JP | H11222608 | A | 8/1999 |
| JP | 2003022905 | A | 1/2003 |
| JP | 2007088108 | A | 4/2007 |
| JP | 2008060183 | A | 3/2008 |
| JP | 4710507 | B2 | 6/2011 |
| JP | 2012142388 | A | 7/2012 |
| JP | 2012142388 | A * | 7/2012 |
| JP | 5218368 | B2 | 6/2013 |
| JP | 2013236071 | A | 11/2013 |
| JP | 2016082176 | A | 5/2016 |
| KR | 900006193 | B1 | 8/1990 |
| KR | 950013979 | B1 | 11/1995 |
| KR | 20110062917 | A | 6/2011 |
| KR | 101354138 | B1 | 1/2014 |
| KR | 101534717 | B1 | 7/2015 |
| KR | 20150099598 | A | 8/2015 |

OTHER PUBLICATIONS

Espacenet machine translation of JP 2012142388 A retrieved on Sep. 27, 2021 (Year: 2012).*
Joseph W. Newkirk, Heat Treatment of Powder Metallurgy Steels, Heat Treating of Irons and Steels, vol. 4D, ASM Handbook, Edited By Jon L. Dossett, George E. Totten, ASM International, 2014, p. 253-273 (Year: 2014).*
Search report from International Application No. PCT/KR2017/011536, dated Feb. 7, 2018.
Search Report from Chinese Application No. 2017800482735 dated Jul. 21, 2021. 2 pgs.
Bissell, The FFC Cambridge Process: Progress and Development, 2006, pp. 1-17, Metalysis.
Chen, et al., Effect of CaCl2 and NdCl3 on the manufacturing of Nd—Fe—8 by the reduction-diffusion process, Journal Appl. Phys., Apr. 1991, pp. 5501-5503, vol. 69, No. 8, American Institute of Physics.
Deheri, et al., Sol-Gel Based Chemical Synthesis of Nd2Fe14B Hard Magnetic Nanoparticles, Chemistry of Materials Article, Nov. 2010, pp. 6509-6517, vol. 22, No. 24, American Chemical Society.
Dong,et al., Synthesis of Nd2Fe14B Powders By Spray-Drying and Reduction-Diffusion Processes, Journal of Materials Research, Apr. 2001, pp. 1083-1089, vol. 16, No. 4, Materials Research Society.
Extended European Search Report including Written Opinion for Application No. EP17869915.3. dated Jun. 6, 2019, pp. 1-15.
Li, et al., Effect of Caf 2 on the Microstructure, Magnetic, and Electrical Properties of Nd—Fe—B Magnets, IEEE Transactions on Magnetics, Nov. 2014, pp. 1-3, vol. 50, No. 11, IEEE.
Sidhu, et al., Effect of Calcium Chloride on the Preparation of NdFeB Alloy Powder by Calciothermic Reduction Process, Metals Materials and Processes, 1999, pp. 35-41, vol. 11, No. 1, Meshap Science Publishers, Mumbai. India.
Wang, et al., Solid State Reactions: An Electrochemical Approach in Molten Salts, Annual Reports Prog. Chem., 2008, pp. 189-234, Sect. C, The Royal Society of Chemistry.

* cited by examiner

METHOD FOR PREPARING METAL POWDER, AND METAL POWDER

CROSS REFERENCE TO RELATED APPLICATIONS

The present application is a national phase entry under 35 U.S.C. § 371 of International Application No. PCT/KR2017/011536 filed on Oct. 18, 2017, which claims the benefit of Korean Patent Application No. 10-2016-0148269 filed on Nov. 8, 2016, the disclosures of which are incorporated here by reference.

TECHNICAL FIELD

Background Art

NdFeB-based magnets are permanent magnets having a composition of $Nd_2Fe_{14}B$, which is a compound of Nd (which is a rare earth element), iron, and boron (B), and they have been used as universal permanent magnets for 30 years since being developed in 1983. Such NdFeB-based magnets are used in various fields such as an electronic information field, an automobile industry field, a medical equipment field, an energy field, and a transportation field. Particularly, they are used in various products such as machine tools, electronic information devices, household electric appliances, mobile phones, robots motors, wind power generators, small motors for automobiles, and driving motors in accordance with the recent lightweight and miniaturization trend.

It is known that the NdFeB-based magnet is generally prepared by a strip/mold casting or melt spinning method based on metal powder metallurgy. The strip/mold casting method includes a process in which a metal such as Nd, iron, or boron (B) is melted by heating to prepare an ingot, grain particles are coarsely pulverized, and micro-particles are prepared through a refining process. The process is repeated to obtain a powder, and then it undergoes a pressing and sintering process under a magnetic field to produce an anisotropic sintered magnet.

The melt spinning method is a method of melting metal elements, then pouring them into a wheel rotating at a high speed, quenching them, and jet milling them, then blending them with a polymer to form a bonded magnet or pressing them to preparing a magnet.

DISCLOSURE

Technical Problem

However, these methods necessarily require a pulverizing process, require a long time for pulverization, and require a process of coating a surface of the pulverized powder.

Technical Solution

The present disclosure has been made in an effort to provide a method for preparing a metal powder in which a pulverizing process may be omitted, and a metal powder that may have a fluoride insulating film on its surface. More specifically, the present invention has been made in an effort to provide a method for preparing a $Nd_2Fe_{14}B$-based alloy powder, and a $Nd_2Fe_{14}B$-based alloy powder provided with a fluoride insulating film on its surface.

An exemplary embodiment of the present invention provides a method for preparing a metal powder, including: preparing a mixture by mixing a fluoride of a group 1 element, a fluoride of a group 2 element or a transition metal fluoride, with neodymium oxide, boron, iron, and a reducing agent; and heating the mixture to a temperature of 800° C. to 1100° C.

The heating of the mixture to a temperature of 800° C. to 1100° C. may be performed under an inert gas atmosphere for 30 minutes to 6 hours.

The prepared metal powder may be $Nd_2Fe_{14}B$.

The prepared metal powder may have a size of 0.5 μm to 10 μm.

The fluoride of the group 1 element may be at least one of NaF, LiF, KF, or RbF.

The fluoride of the group 2 element may be at least one of $CaF_2$, $MgF_2$, $SrF_2$, $BaF_2$, and or $RaF_2$.

The transition metal fluoride may be at least one of $AlF_3$, $CoF_2$, $CrF_3$, $FeF_2$, $NiF_2$, or $ZrF_4$.

The reducing agent may be at least one of calcium, calcium hydride, or calcium carbide.

A total content of the fluoride of the group 1 element, the fluoride of the group 2 element or the transition metal fluoride may be 1 wt % to 5 wt % of a finally prepared metal powder.

A fluoride insulating film may be formed on a surface of the metal powder.

The method for preparing the metal powder may further include molding the mixture to prepare a molded body after the preparing of the mixture, and before the heating of the mixture to the temperature of 800° C. to 1100° C., wherein the heated mixture may be the molded body.

The method for preparing the metal powder may further include pulverizing the molded body after the mixture is heated to the temperature of 800° C. to 1100° C.

A metal powder according to an exemplary embodiment of the present invention may be prepared by: preparing a mixture by mixing a fluoride of a group 1 element, a fluoride of a group 2 element or a transition metal fluoride, neodymium oxide, boron, iron, and a reducing agent; and heating the mixture to a temperature of 800° C. to 1100° C.

Another exemplary embodiment of the present invention provides a metal powder including $Nd_2Fe_{14}B$, wherein a size thereof may be 0.5 μm to 10 μm, and a fluoride insulating film may be disposed on a surface thereof.

The fluoride insulating film may be at least one of a fluoride of a group 1 element, a fluoride of a group 2 element, a transition metal fluoride, and $NdF_3$.

Advantageous Effects

According to the method for preparing the metal powder of the exemplary embodiment of the present invention, a pulverization process and a surface treatment process may be omitted, which is economical. In addition, since the metal powder according to the exemplary embodiment of the present embodiment is provided with a fluoride insulating film on its surface, it is possible to prevent agglomeration of the metal powder and improve corrosion resistance and electrical resistance. When the metal powder having the improved electrical resistance is applied to a motor, it is possible to reduce heat generated in the motor, thereby improving motor efficiency.

MODE FOR INVENTION

Figure 1A:
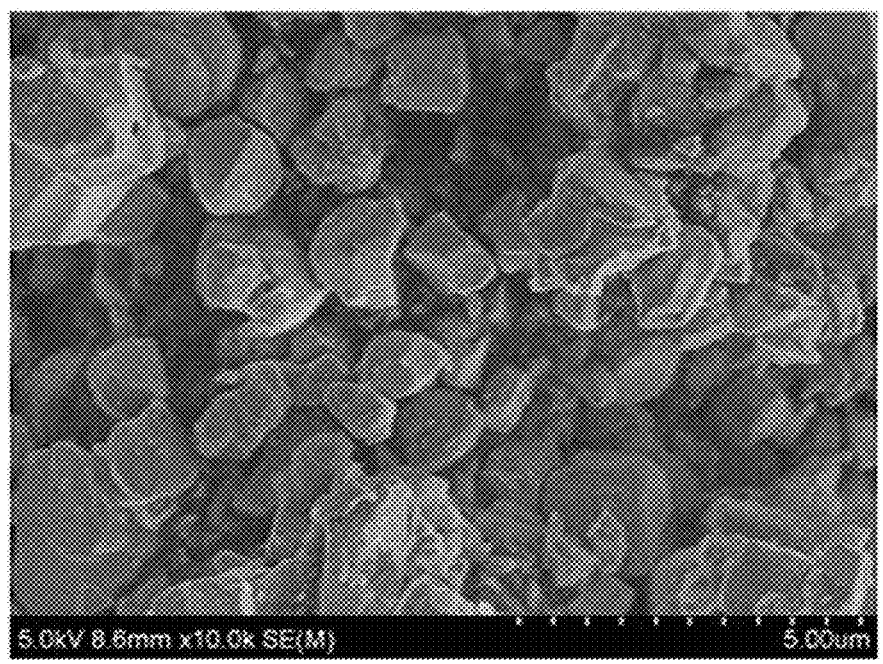
FIG. 1(A) illustrates a scanning electron microscope image and FIG. 1(B) illustrates an X-ray diffraction pattern of a $Nd_2Fe_{14}B$-based alloy powder prepared according to Example 1.

Hereinafter, a method for preparing a metal powder according to an exemplary embodiment of the present disclosure will be described in detail. A method for preparing a metal powder according to the present exemplary embodiment may be a method for preparing $Nd_2Fe_{14}B$ metal powder. That is, the method for preparing the metal powder according to the present exemplary embodiment may be a method for preparing a $Nd_2Fe_{14}B$-based alloy powder. The $Nd_2Fe_{14}B$ alloy powder is referred to as a neodymium magnet which is a permanent magnet.

The method for preparing the metal powder according to the present disclosure includes: preparing a mixture by mixing a fluoride of a group 1 element, and a fluoride of a group 2 element or a transition metal fluoride, with neodymium oxide, boron, iron, and a reducing agent, and heating the mixture to a temperature of 800° C. to 1100° C. The metal powder according to the present disclosure is formed by mixing a fluoride of a group 1 element, and a fluoride of a group 2 element or a transition metal fluoride, with a raw material and then processing the mixed materials by a reduction-diffusion method, however it does not additionally require a pulverizing process such as a coarse pulverizing process, a hydrogen pulverizing process, or a jet milling process, or a surface treatment process.

Now, each process therefor will be described in detail.

First, the preparing of the mixture by mixing a fluoride of a group 1 element, and a fluoride of a group 2 element or a transition metal fluoride, with neodymium oxide, boron, iron, and a reducing agent, will be described. The reducing agent may be at least one of calcium, calcium hydride, or calcium carbide. The fluoride, that is, the fluoride of the group 1 element, the fluoride of the group 2 element or the transition metal fluoride, serves as an insulator in the mixture. Therefore, when raw material particles such as neodymium oxide, boron, iron, and a reducing agent react with each other to form a powder, a fluoride insulating film may be formed on surfaces of the particles, and a size of a particle synthesized with CaO formed as a by-product may be controlled.

The fluoride of the group 1 element may be at least one of NaF, LiF, KF, or RbF. In addition, the fluoride of the group 2 element may be at least one of $CaF_2$, $MgF_2$, $SrF_2$, $BaF_2$, or $RaF_2$, and the transition metal fluoride may be at least one of $AlF_3$, $CoF_2$, $CrF_3$, $FeF_2$, $NiF_2$, or $ZrF_4$. However, the present invention is not limited thereto, and any fluoride of a group 1 element, any fluoride of a group 2 element or any transition metal fluoride, may be used without limitation. In addition, the present invention is not limited to a single material, and a mixture containing all or some of the fluoride of the group 1 element, the fluoride of the group 2 element, and/or the transition metal fluoride may be used.

When the transition metal fluoride is used, it is easy to control a particle size of a NdFeB-based powder synthesized during a process reacting therewith, and agglomeration of the NdFeB-based powder may also be controlled. In addition, the transition metal fluoride is coated on a surface of the NdFeB-based powder, and it is doped (within 5%) in NdFeB columnar particles, thus it is possible to improve corrosion resistance, and physical properties such as coercive force, residual magnetization density, and a Curie temperature.

A content of the fluoride of a group 1 element, the fluoride of the group 2 element or the transition metal fluoride, may be 1 wt % to 10 wt % of the finally prepared metal powder. More preferably, it may be 2 wt % of the finally prepared metal powder. That is, the content of the fluoride of the group 1 element, the fluoride of the group 2 element or the transition metal fluoride, may vary depending on a weight of a metal powder to be finally prepared.

A molar ratio of neodymium oxide, boron, and iron in the mixture may be between 1:14:1 and 1.5:14:1. Neodymium oxide, boron, and iron are raw materials for preparing a $Nd_2Fe_{14}B$ metal powder, and when the molar ratio is satisfied, the $Nd_2Fe_{14}B$ alloy powder may be produced with a high yield. When the molar ratio is 1:14:1 or less, a $Nd_2Fe_{14}B$ columnar composition is varied, or a rich Nd grain boundary phase may not be formed, and when the molar ratio is 1.5:14:1 or more, reduced Nd is left due to an excessive amount of Nd, and the remaining Nd in a post-treatment process may be changed to $Nd(OH)_3$ or $NdH_2$.

Next, the mixture is heated to a temperature of 800° C. to 1100° C. Such heating may be performed in an inert gas atmosphere for 30 minutes to 6 hours. When the heating time is 30 minutes or less, the metal powder may not be sufficiently synthesized, and when the heating time is 6 hours or more, the metal powder is coarsened and primary particles may be agglomerated.

As such, the prepared metal powder may be $Nd_2Fe_{14}B$. A size of the prepared metal powder may be 0.5 μm to 10 μm. Alternatively, a size of a metal powder prepared according to some exemplary embodiments may be 0.5 μm to 5 μm.

That is, the $Nd_2Fe_{14}B$ alloy powder is formed by heating the raw material to the temperature of 800° C. to 1100° C., and it exhibits excellent magnetic properties as a neodymium magnet. Generally, in order to form the $Nd_2Fe_{14}B$ alloy powder, the raw material is melted at a high temperature of 1500° C. to 2000° C. and then quenched to form a raw material mass, and the raw material mass is coarsely pulverized and hydrogen pulverized to obtain the $Nd_2Fe_{14}B$ alloy powder.

However, the method requires a high temperature to melt the raw material, and requires a process for cooling the raw material and then pulverizing it, thus a process time is long and the process is complicated. Further, a separate surface treatment process is required for strengthening and improving the corrosion resistance and the electrical resistance of the coarsely pulverized $Nd_2Fe_{14}B$ alloy powder.

However, in the method for preparing the metal powder according to the present exemplary embodiment, the raw material and the fluoride, that is, the raw material and the fluoride of the group 1 element, the fluoride of the group 2 element or the transition metal fluoride, are mixed, and the $Nd_2Fe_{14}B$ alloy powder is formed by reduction and diffusion of the raw materials at a temperature of 800° C. to 1100° C. In this case, since the alloy powder is formed with a size of several micrometers, no separate pulverizing process is required. More specifically, the size of the metal powder prepared in the present exemplary embodiment may be between 0.5 μm and 10 μm. Particularly, by controlling a size of iron powder used as a raw material, the size of the alloy powder to be prepared may be controlled.

In addition, in the method for preparing the metal powder according to the present exemplary embodiment, since the mixture includes the fluoride of the group 1 element, the fluoride of the group 2 element or the transition metal fluoride, the surface of the finally prepared $Nd_2Fe_{14}B$ metal powder may be coated with a fluoride insulating film. Therefore, no separate surface treatment process is required. That is, the method for preparing the metal powder according to the present exemplary embodiment does not require a higher temperature than a conventional method, it requires no separate pulverizing process, and a surface treatment process may be omitted, thus it is economical.

However, the method for preparing the metal powder according to the present disclosure may include forming the mixture into a molded body, and then pulverizing the molded body. That is, a method for preparing a metal powder according to another exemplary embodiment may include: preparing a mixture by mixing the fluoride of the group 1 element, and the fluoride of the group 2 element or the transition metal fluoride, with neodymium oxide, boron, iron, and a reducing agent; forming a molded body by molding the mixture; heating the molded body to a temperature of 800° C. to 1100° C.; and pulverizing the heated molded body. The reducing agent may be at least one of calcium, calcium hydride, and calcium carbide. In addition, the method may further include removing calcium oxide, which is a byproduct generated in the preparation process, with a weak acid aqueous solution such as acetic acid or ammonium acetate. The preparation method according to the present exemplary embodiment is the same as the method for preparing the metal powder according to the previous exemplary embodiment, except that the mixture is molded into the molded body and then pulverized again. Detailed description for the same constituent elements will be omitted.

Since the method for preparing the metal powder according to the present exemplary embodiment makes the mixture into the molded body, a uniform reduction-diffusion reaction is possible during a synthesis process. In addition, in the method for preparing the metal powder according to the present exemplary embodiment, the pulverizing of the molded body is much simpler than the pulverizing of the molten mass. Further, in preparation processes according to some exemplary embodiments, the alloy powder may be prepared by mixing the raw materials and then hardening the mixture in a powder form without molding and then heating it under a non-oxidizing condition.

Hereinafter, the metal powder according to the exemplary embodiment will be described. The metal powder according to the present exemplary embodiment may be prepared by the above-described preparing method. The metal powder according to the present exemplary embodiment may include $Nd_2Fe_{14}B$, its size may be 0.5 μm to 10 μm, and the fluoride insulating film may be coated on its surface. The fluoride insulating film may be at least one of a fluoride of a group 1 element, a fluoride of a group 2 element, a transition metal fluoride, or $NdF_3$.

Hereinafter, a method for preparing the metal powder according to the present disclosure will be described with reference to specific examples.

Example 1

0.2053 g of $CaF_2$ (2 wt % based on a product), 3.4299 g of $Nd_2O_3$, 0.1000 g of B, 7.2299 g of Fe, and 1.8345 g of Ca were uniformly mixed, and molded to have a cylindrical shape with a diameter of about 1 cm. The molded mixture was heat-treated in an inert gas (Ar, He) atmosphere at a temperature of 950° C. for 6 hours in a tube furnace. Then, after changing to a vacuum atmosphere condition, the molded mixture was treated for about 1 hour to separate unreacted Ca by moving it to a low temperature region in a vapor state.

After the reaction was completed, the molded product was ground with a mortar to obtain a powder, and a CaO by-product was removed with an aqueous solution of ammonium acetate. Next, the powder was washed with acetone and then vacuum-dried to obtain a $Nd_2Fe_{14}B$ metal powder.

Figure 1B:
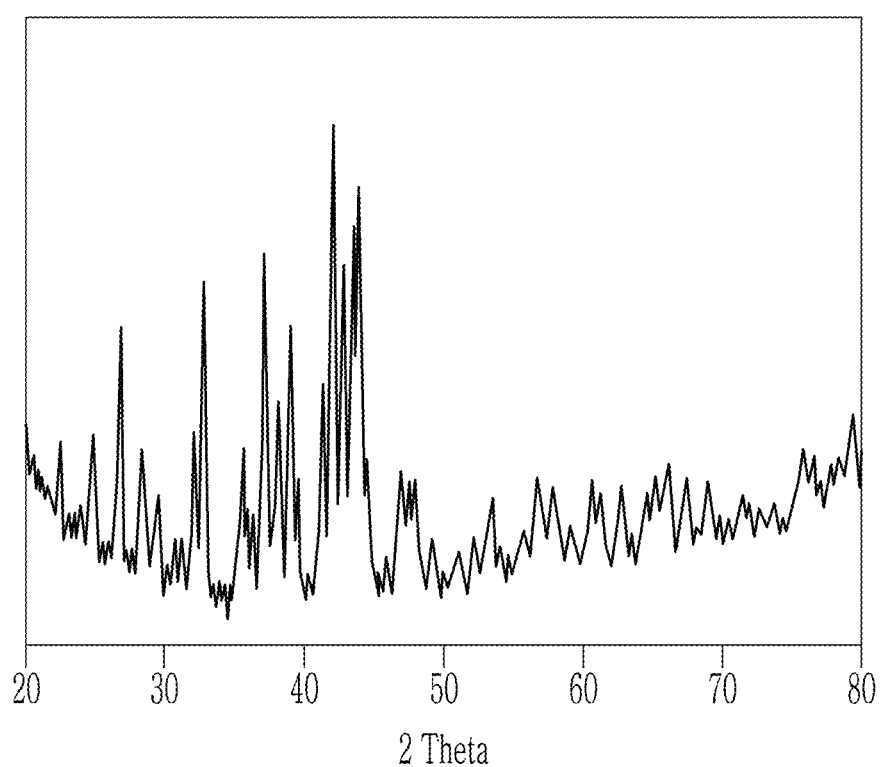

A scanning electron microscope image is shown in FIG. 1(A) and an X-ray diffraction pattern of the prepared metal powder are shown in FIG. 1(B).

Example 2

Figure 2A:
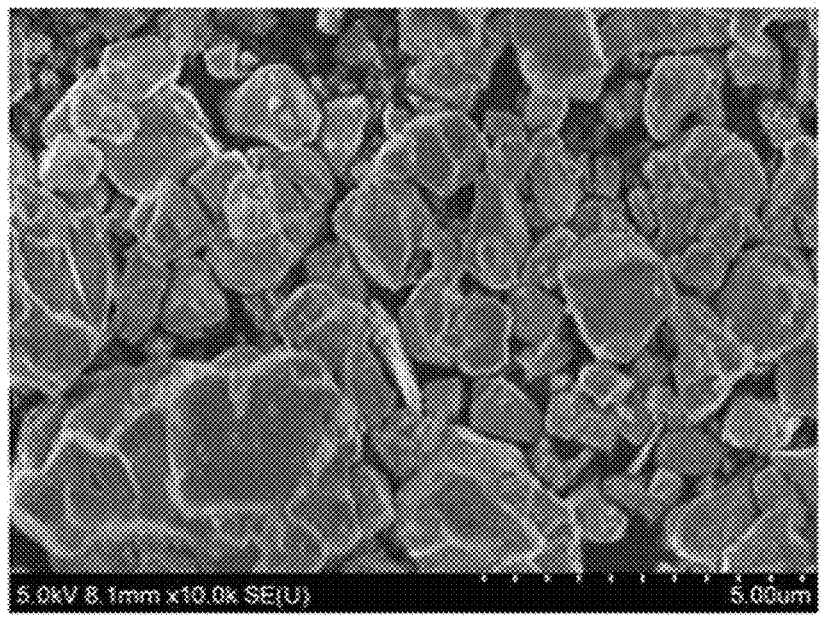
FIG. 2(A) illustrates a scanning electron microscope image and FIG. 2(B) illustrates an X-ray diffraction pattern of a $Nd_2Fe_{14}B$-based alloy powder prepared according to Example 2.
Figure 2B:
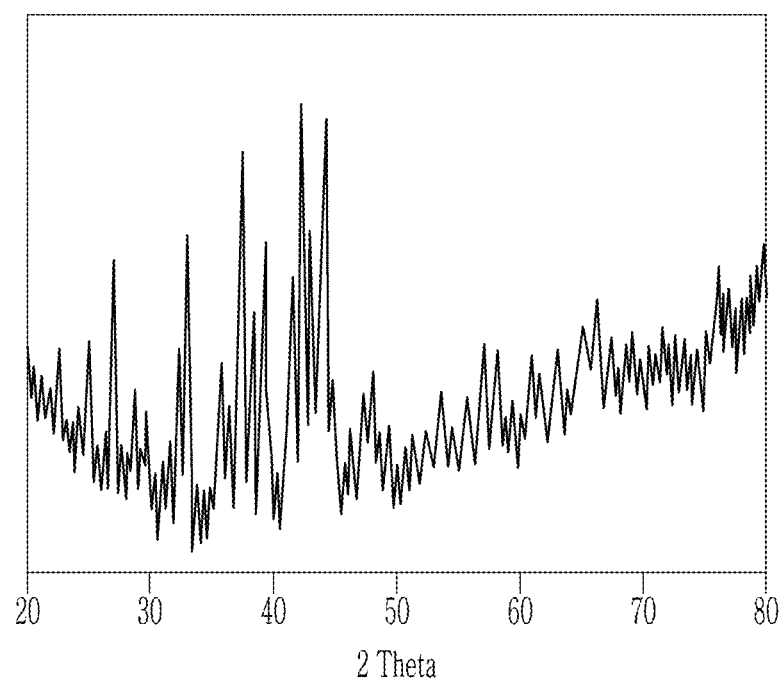

$Nd_2Fe_{14}B$ metal powder was prepared in the same method as in Example 1, except that $MgF_2$ of the same weight was used instead of 0.2053 g of $CaF_2$ (2 wt % based on the product). A scanning electron microscope image is shown in FIG. 2(A) and an X-ray diffraction pattern of the prepared metal powder is shown in FIG. 2(B).

Example 3

Figure 3A:
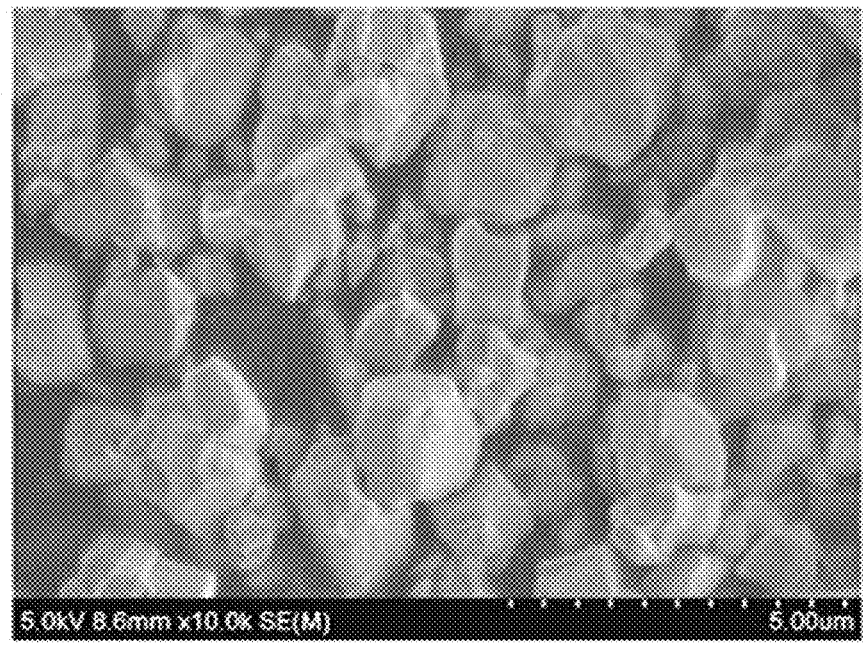
FIG. 3(A) illustrates a scanning electron microscope image and FIG. 3(B) illustrates an X-ray diffraction pattern of a $Nd_2Fe_{14}B$-based alloy powder prepared according to Example 3.
Figure 3B:
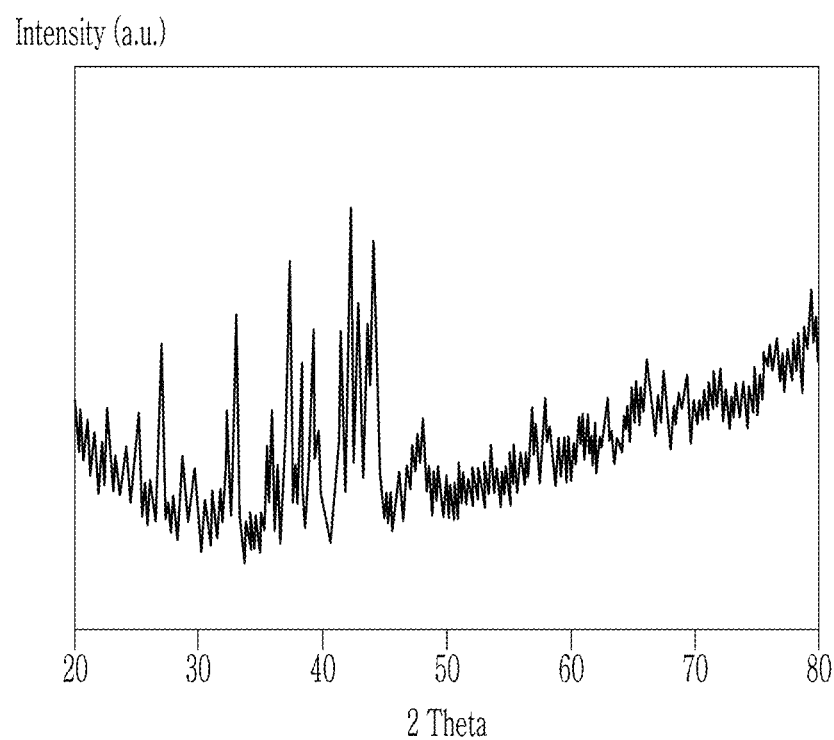

$Nd_2Fe_{14}B$ metal powder was prepared in the same method as in Example 1, except that KF of the same weight was used instead of 0.2053 g of $CaF_2$ (2 wt % based on the product) and the molded mixture was reacted at 900° C. for 6 hours. A scanning electron microscope image is shown in FIG. 3(A) and an X-ray diffraction pattern of the prepared metal powder is shown in FIG. 3(B).

Example 4

Figure 4:
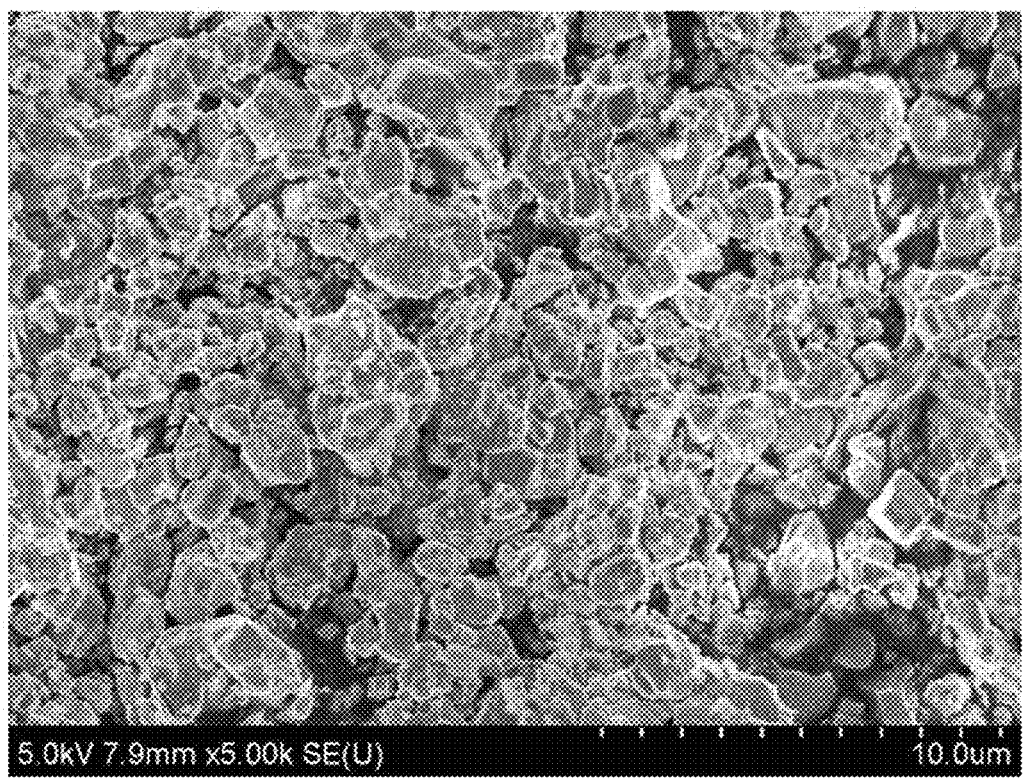
FIG. 4 illustrates a scanning electron microscope image of a $Nd_2Fe_{14}B$-based alloy powder prepared according to Example 4.

$Nd_2Fe_{14}B$ metal powder was prepared in the same method as in Example 1, except that 0.2053 g of a mixture of $CaF_2$ and KF was included instead of 0.2053 g of $CaF_2$ (2 wt % based on the product) and the molded mixture was reacted at 900° C. for 6 hours. A scanning electron microscope image of the prepared metal powder is shown in FIG. 4.

Example 5

Figure 5:
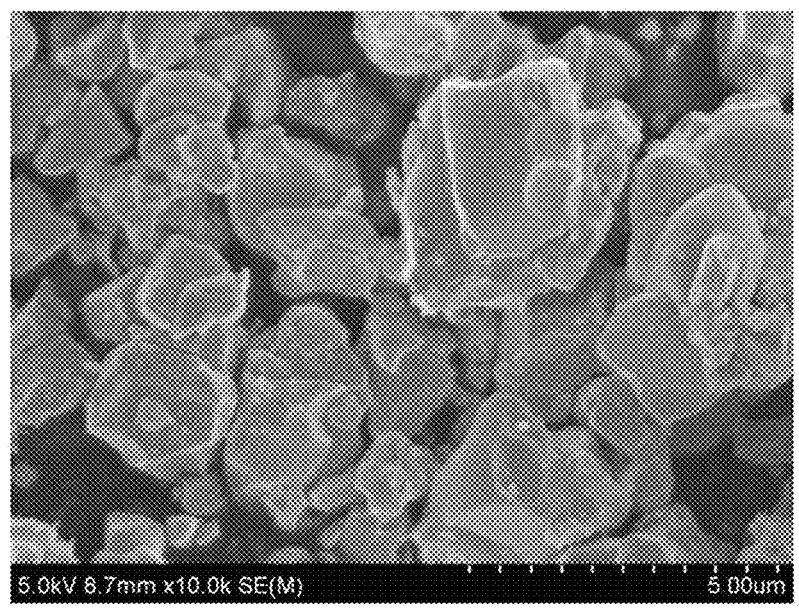
FIG. 5 illustrates a scanning electron microscope image of a $Nd_2Fe_{14}B$-based alloy powder prepared according to Example 5.

0.2053 g of $CaF_2$ (2 wt % based on the product), 3.4299 g of $Nd_2O_3$, 0.1000 g of B, 7.2299 g of Fe, 1.8345 g of Ca, and 0.1113 g of Mg were uniformly mixed, and then molded to have a cylindrical shape with a diameter of about 1 cm. Thereafter, $Nd_2Fe_{14}B$ metal powder was prepared in the same method as in Example 1. A scanning electron microscope image of the prepared metal powder is shown in FIG. 5.

Referring to Examples 1 to 5, it was confirmed that the $Nd_2Fe_{14}B$ metal powder prepared according to each example had a size of several micrometers even though it was not subjected to a separate pulverizing process.

Example 6

Figure 6:
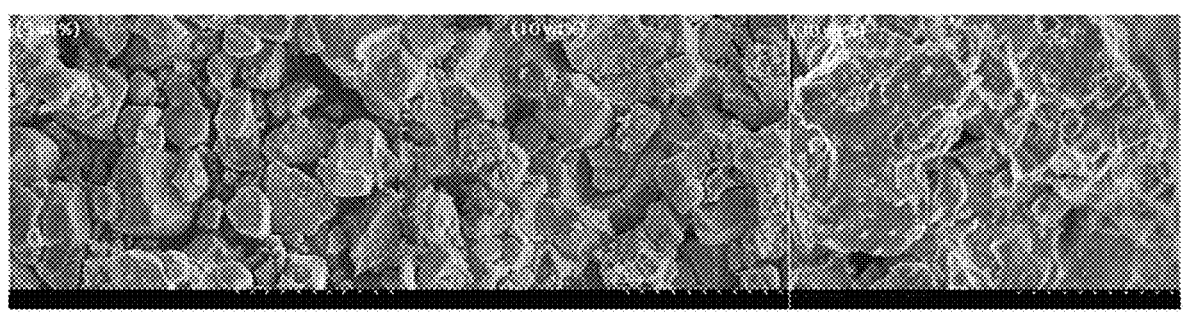
FIG. 6 illustrates a scanning electron microscope image of a $Nd_2Fe_{14}B$-based alloy powder prepared according to Example 6.

$Nd_2Fe_{14}B$ metal powder was prepared in the same method as in Example 1, while the content of $CaF_2$ was changed to 5 wt %, 10 wt %, and 30 wt % based on the product. The result is shown in FIG. 6. Referring to FIG. 6, as the content of $CaF_2$ was increased, it was confirmed that the particles of the metal powder were coarsened.

That is, when the content of $CaF_2$ was more than 10 wt %, it was confirmed that the particle size of the metal powder was not preferable because it was 5 μm or more.

Example 7

Figure 7:
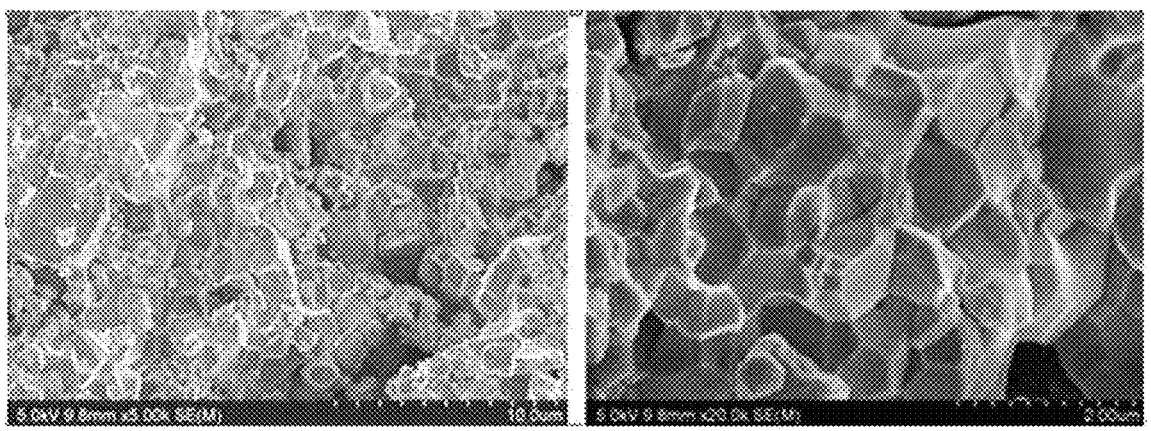
FIG. 7 illustrates a scanning electron microscope image of a $Nd_2Fe_{14}B$-based alloy powder prepared according to Example 7.

$Nd_2Fe_{14}B$ metal powder was prepared in the same method as in Example 1, except that 0.1506 g of $ZrF_4$ was included instead of 0.2053 g of $CaF_2$ (2 wt % based on the product) and the molded mixture was reacted at 950° C. for 6 hours. A scanning electron microscope image of the prepared metal powder is shown in FIG. 7.

Example 8

Figure 8:
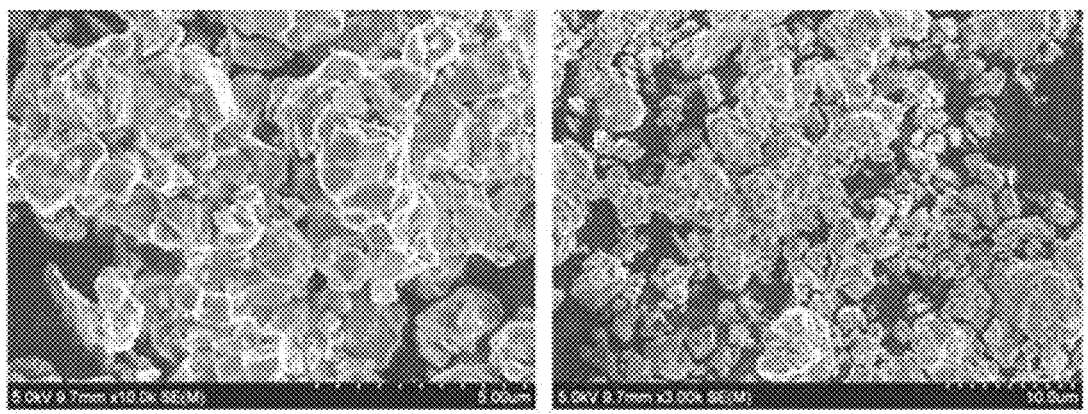
FIG. 8 illustrates a scanning electron microscope image of a $Nd_2Fe_{14}B$-based alloy powder prepared according to Example 8.

$Nd_2Fe_{14}B$ metal powder was prepared in the same method as in Example 1, except that 0.1553 g of $AlF_3$ was included instead of 0.2053 g of $CaF_2$ (2 wt % based on the product) and the molded mixture was reacted at 950° C. for 6 hours. A scanning electron microscope image of the prepared metal powder is shown in FIG. 8.

Example 9

Figure 9:
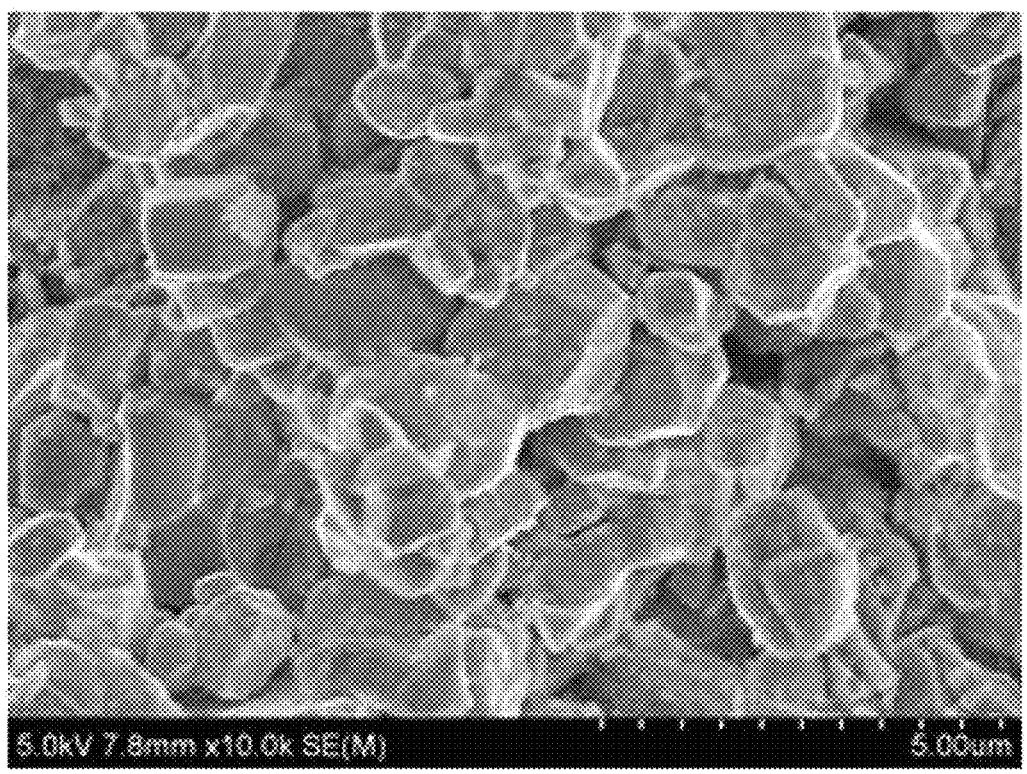
FIG. 9 illustrates a scanning electron microscope image of a $Nd_2Fe_{14}B$-based alloy powder prepared according to Example 9.

$Nd_2Fe_{14}B$ metal powder was prepared in the same method as in Example 1, except that 0.2053 g of $CoF_3$ was included instead of 0.2053 g of $CaF_2$ (2 wt % based on the product) and the molded mixture was reacted at 950° C. for 6 hours. A scanning electron microscope image of the prepared metal powder is shown in FIG. 9.

Comparative Example 1

Figure 10:
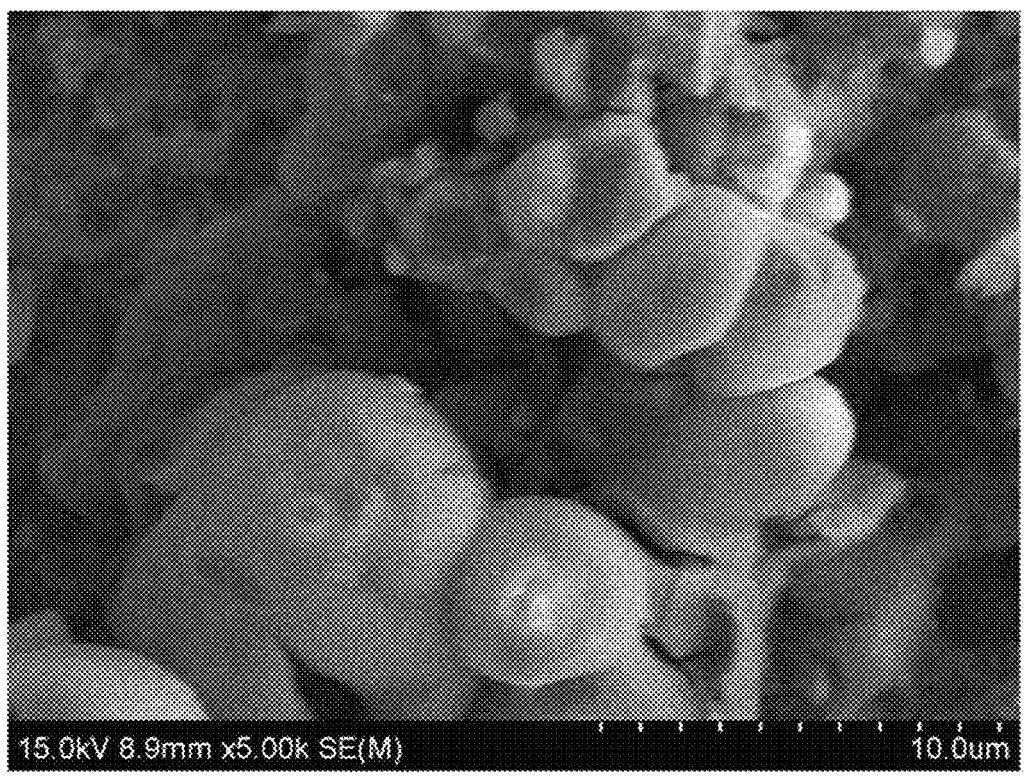
FIG. 10 illustrates a scanning electron microscope image of a $Nd_2Fe_{14}B$-based alloy powder prepared according to Comparative Example 1.

0.2053 g of $CaCl_2$ (2 wt % based on a product), 3.4299 g of $Nd_2O_3$, 0.1000 g of B, 7.2299 g of Fe, and 1.8345 g of Ca were sequentially and uniformly mixed, and molded to have a cylindrical shape with a diameter of about 1 cm. The molded mixture was heat-treated in an inert gas (Ar, He) atmosphere at a temperature of 950° C. for 6 hours in a tube furnace. After the reaction was completed, the molded product was ground with a mortar to obtain a powder, and a CaO by-product was removed with an aqueous solution of water and acetic acid. Next, the powder was washed with acetone and then vacuum-dried to obtain a $Nd_2Fe_{14}B$ metal powder. A scanning electron microscope image of the prepared metal powder is shown in FIG. 10. As a result, Oswald ripening occurred and it was confirmed that the particles of the metal powder were coarsened to have a size of equal to or greater than 5 μm. That is, since the method for preparing the metal powder according to the present comparative example does not include the fluoride of the group 1 or group 2 element, it can be confirmed that the metal powder was not formed in a size of 0.5 μm to 5 μm as in the present invention.

Comparative Example 2

Figure 11:
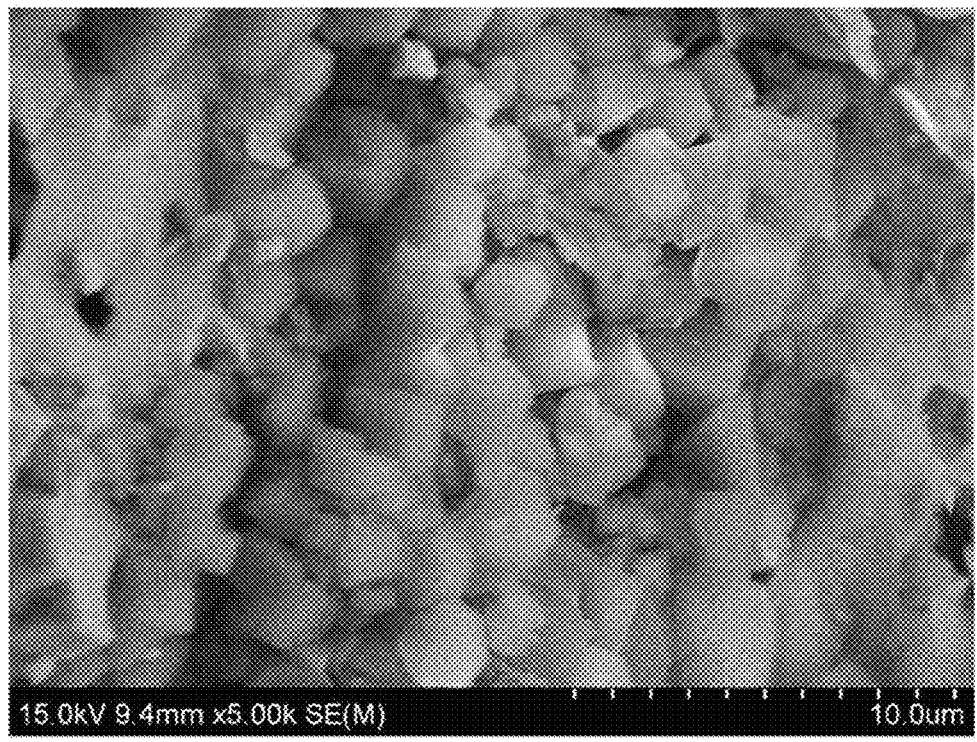
FIG. 11 illustrates a scanning electron microscope image of a $Nd_2Fe_{14}B$-based alloy powder prepared according to Comparative Example 2.

3.4299 g of $Nd_2O_3$, 0.1000 g of B, and 7.2299 g of Fe were sequentially and uniformly mixed, and molded to have a cylindrical shape with a diameter of about 1 cm. The molded mixture was heat-treated in an inert gas (Ar, He) atmosphere at a temperature of 950° C. for 2 hours in a tube furnace. After the heat treatment, the sintered cylinder was pulverized and then uniformly mixed with 1.8345 g of Ca in a glove box to be molded to have a cylindrical shape with a diameter of about 1 cm. The molded mixture was heat treated in a tube furnace at 950° C. for 6 hours. After the reaction was completed, the molded product was ground with a mortar to obtain a powder, and a CaO by-product was removed with an aqueous solution of water and acetic acid. Next, the powder was washed with acetone and then vacuum-dried to obtain a $Nd_2Fe_{14}B$ metal powder. A scanning electron microscope image of the prepared metal powder is shown in FIG. 11. As a result, it was confirmed that agglomeration occurred between the metal powders. That is, the metal powders aggregated together to form a coarse mass. Since the method for preparing the metal powder according to Comparative Example 2 does not include the fluoride of the group 1 or group 2 element, it can be confirmed that the metal powder was not formed in a size of 0.5 μm to 5 μm as in the present invention.

As described above, the method for preparing the metal powder according to the present disclosure in which the fluoride of the group 1 or 2 element is mixed does not require a higher temperature than a conventional method, it requires no separate pulverizing process, and a surface treatment process may be omitted, thus it is economical. In addition, since the fluoride insulating film is coated on the surface of the metal powder according to the present disclosure, it is possible to control the particle size of the metal powder, to suppress the aggregation thereof, and to improve the corrosion resistance and electrical resistance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:
1. A method for preparing a metal powder, comprising:
preparing a mixture by mixing neodymium oxide, boron, iron, and a reducing agent with at least one of a fluoride of a group 1 element, a fluoride of a group 2 element or a transition metal fluoride;
molding the mixture to prepare a molded body after the preparing of the mixture,
heating the molded body to a temperature of more than 800° C. to 1100° C. under an inert gas atmosphere; and
forming the metal powder,
wherein the metal powder is $Nd_2Fe_{14}B$,
wherein the reducing agent is at least one of calcium, calcium hydride, or calcium carbide, and wherein a total content of the fluoride of the group 1 element, the fluoride of the group 2 element or the transition metal fluoride is 1 wt % to 10 wt % of the metal powder.

2. A method for preparing a metal powder, comprising:
   preparing a mixture by mixing neodymium oxide, boron, iron, and a reducing agent with at least one of a fluoride of a group 1 element, a fluoride of a group 2 element or a transition metal fluoride;
   heating the mixture to a temperature of 800° C. to 1100° C. under an inert gas atmosphere; and
   forming the metal powder,
   wherein the metal powder is $Nd_2Fe_{14}B$, and
   wherein the reducing agent is at least one of calcium, calcium hydride, or calcium carbide, and
   wherein the method does not include a pulverizing process,
   and the method does not include a surface treating process.

3. The method for preparing the metal powder of claim 1, wherein
   the heating of the molded body to the temperature of more than 800° C. to 1100° C. under the inert gas atmosphere is performed for 30 minutes to 6 hours.

4. The method for preparing the metal powder of claim 1, wherein
   the metal powder has a size of 0.5 μm to 10 μm.

5. The method for preparing the metal powder of claim 1, wherein
   the fluoride of the group 1 element is at least one of NaF, LiF, KF, or RbF.

6. The method for preparing the metal powder of claim 1, wherein
   the fluoride of the group 2 element is at least one of $CaF_2$, $MgF_2$, $SrF_2$, $BaF_2$, or $RaF_2$.

7. The method for preparing the metal powder of claim 1, wherein
   the transition metal fluoride is at least one of $AlF_3$, $CoF_2$, $CrF_3$, $FeF_2$, $NiF_2$, or $ZrF_4$.

8. The method for preparing the metal powder of claim 1, wherein
   the total content of the fluoride of the group 1 element, the fluoride of the group 2 element or the transition metal fluoride is 1 wt % to 5 wt % of the metal powder.

9. The method for preparing the metal powder of claim 1, wherein
   a fluoride insulating film is formed on a surface of the metal powder.

10. The method for preparing the metal powder of claim 1, further comprising
    pulverizing the molded body after the molded body is heated to the temperature of more than 800° C. to 1100° C.

11. The method of claim 1, wherein the method does not include a surface treating process.

12. The method of claim 1, wherein the metal powder is formed by a reduction-diffusion method.

* * * * *